(12) United States Patent
Gourault (10) Patent No.: US 10,495,054 B2
(45) Date of Patent: Dec. 3, 2019

(54) SUPER GRAAL POWER PRODUCTION SYSTEM

(71) Applicant: Dominique-José Gourault, Saint Fargeau (FR)

(72) Inventor: Dominique-José Gourault, Saint Fargeau (FR)

( * ) Notice: Subject to any disclaimer, the term of this patent is extended or adjusted under 35 U.S.C. 154(b) by 247 days.

(21) Appl. No.: 15/565,629

(22) PCT Filed: Apr. 13, 2016

(86) PCT No.: PCT/FR2016/050858
§ 371 (c)(1),
(2) Date: Oct. 10, 2017

(87) PCT Pub. No.: WO2016/166476
PCT Pub. Date: Oct. 20, 2016

(65) Prior Publication Data
US 2018/0073485 A1    Mar. 15, 2018

(30) Foreign Application Priority Data

Apr. 14, 2015    (FR) ..................................... 15 53265

(51) Int. Cl.
*F03B 17/02*    (2006.01)
*G03B 17/06*    (2006.01)
*F03B 17/06*    (2006.01)

(52) U.S. Cl.
CPC ............ *F03B 17/025* (2013.01); *F03B 17/06* (2013.01); *Y02E 10/20* (2013.01); *Y02E 10/28* (2013.01); *Y02E 60/17* (2013.01)

(58) Field of Classification Search
CPC ... F03G 7/002; F03G 7/10; F03G 3/00; F03B 17/025; F03B 17/02; F03B 17/04;
(Continued)

(56) References Cited

U.S. PATENT DOCUMENTS 155,328 A * 9/1874 Middleton ............... B60K 6/48
60/716
474,238 A    5/1892 Gardner
(Continued)

FOREIGN PATENT DOCUMENTS

FR            909615 A        5/1946

OTHER PUBLICATIONS

International Search Report (PCT/ISA/210) English version; dated Jul. 8, 2016 of corresponding PCT/FR2016/050858 (3 pages).
(Continued)

*Primary Examiner* — Mark A Laurenzi
*Assistant Examiner* — Mickey H France
(74) *Attorney, Agent, or Firm* — Maier & Maier, PLLC (57) ABSTRACT

An electrical power production system with at least one assembly including a first module and a second module, which operate antagonistically. The first and second modules are identical, symmetrical, and each include, respectively, a main vessel connected to a first or second liquid tank, respectively, an outer ballast vessel capable of moving into the main vessel, an inner ballast vessel capable of moving into the ballast vessel, a ballasted skirt that is suspended on said outer ballast vessel, and is capable of vertically opening out or closing, and first and second transmission devices for transmitting the movement of the outer and inner ballast vessels to alternators.

15 Claims, 8 Drawing Sheets

(58) Field of Classification Search
CPC ........ F03B 17/06; F03B 17/005; Y02E 10/20; Y02E 10/28; Y02E 60/17
USPC .......................................... 60/639, 640, 496
See application file for complete search history.

(56) References Cited

U.S. PATENT DOCUMENTS

| | | | | |
|---|---|---|---|---|
| 479,291 | A * | 7/1892 | Marsh | F03B 17/02 60/640 |
| 1,550,408 | A * | 8/1925 | Witt | F03B 17/00 60/496 |
| 1,674,281 | A * | 6/1928 | Fleming | F28F 25/082 261/114.1 |
| 2,239,064 | A * | 4/1941 | Tower | F03B 17/02 60/640 |
| 3,474,238 | A * | 10/1969 | Ragen | G06F 7/4985 708/651 |
| 4,472,937 | A * | 9/1984 | Isamu | F03B 17/025 60/503 |
| 4,583,368 | A * | 4/1986 | Neuenschwander | F03G 3/00 60/398 |
| 4,599,857 | A * | 7/1986 | Kim | F03B 17/025 417/337 |
| 4,674,281 | A | 6/1987 | Kim et al. | |
| 4,838,025 | A * | 6/1989 | Nelis | F03B 17/025 60/398 |
| 6,546,726 | B1 * | 4/2003 | Tomoiu | F03B 17/02 60/495 |
| 2006/0168953 | A1 * | 8/2006 | Carter | F03B 17/04 60/392 |
| 2007/0080540 | A1 * | 4/2007 | Tung | F03B 17/025 290/43 |
| 2008/0264056 | A1 * | 10/2008 | Tung | F03B 17/02 60/496 |
| 2010/0115940 | A1 * | 5/2010 | Propp | F03B 17/025 60/496 |
| 2011/0011086 | A1 * | 1/2011 | Megaro | F03B 13/00 60/640 |
| 2011/0120109 | A1 * | 5/2011 | McGillis | F03B 17/025 60/502 |
| 2012/0006015 | A1 | 1/2012 | McGillis | |
| 2013/0036731 | A1 * | 2/2013 | Kerckove | F03B 13/264 60/496 |
| 2013/0154270 | A1 | 6/2013 | Shinohara | |
| 2013/0270835 | A1 * | 10/2013 | Pingitore | F03B 17/005 290/1 A |
| 2013/0291532 | A1 * | 11/2013 | Chen | C02F 1/04 60/495 |
| 2014/0130497 | A1 * | 5/2014 | Anteau | F03G 7/04 60/639 |
| 2014/0298796 | A1 * | 10/2014 | Dunn | F03B 17/025 60/531 |
| 2014/0312623 | A1 * | 10/2014 | Anteau | F03B 17/005 290/52 |
| 2014/0331670 | A1 * | 11/2014 | Zarisfi | H02J 15/00 60/639 |
| 2014/0345262 | A1 * | 11/2014 | Ehrnberg | F03B 13/188 60/327 |
| 2015/0330357 | A1 * | 11/2015 | Saxe | F03G 7/06 60/496 |

OTHER PUBLICATIONS

Written opinion of PCT/ISA/237 in French language, dated Jul. 8, 2016 of corresponding PCT/FR2016/050858 (5 pages).

* cited by examiner

SUPER GRAAL POWER PRODUCTION SYSTEM

TECHNICAL FIELD

This invention relates to an electrical power production system that uses at least two permanent and non-polluting forces such as terrestrial gravity and Archimedes' buoyancy.

PRIOR ART

Today, it appears to be vital to find methods of producing electrical power that do not use the conventional sources of energy that are used, in particular in light of the scheduled rarefaction of sources of fossil fuels. In addition, these conventional sources of energy have the major disadvantage of being particularly polluting in terms of gas emissions and discharge into the atmosphere or on the ground of waste that is difficult to recycle. This is particularly the case, for nuclear power plants.

The development of electrical power production systems using renewable sources of energy has consequently, for a few years now, accelerated. As such, the number of solar panel arrays and/or wind farms has experienced substantial growth or falling water hydroelectric generators such as the one described in US patent application 2012/006015.

However, these electrical power production systems are complex to manufacture and do not always have a substantial output, as their output depends on the weather conditions (power and duration of sunshine and the force of the wind) of the site where these electrical power production systems are installed. Therefore, this type of electrical power production systems, which cannot be installed everywhere, require the conducting, before any installation, of a study in order to check if the weather conditions of a given site make it possible to profitably install said electrical power production system.

DESCRIPTION OF THE INVENTION

The purpose of this invention is therefore to overcome the aforementioned disadvantages and to propose an alternative to the known electrical power production systems that use at least two permanent forces such as terrestrial gravity and Archimedes' buoyancy; with this alternative making it possible to generate the electrical power using a renewable source of energy without any harmful effect on said source and without any polluting discharge into the atmosphere or on the ground, on a regular basis without any dependency on the weather conditions on the installation site.

In accordance with the first object of the invention, an electrical power production system is therefore proposed comprising at least one assembly including a first module and a second module, which operate antagonistically, said first and second modules being identical, symmetrical, and each including respectively a main vessel connected respectively, on the one hand, to a first or second liquid tank and, on the other hand, to a first or second drain, and able to be filled with said liquid or emptied, said system being remarkable in that said first and second modules each respectively comprise:

an outer ballast vessel able to be filled with the liquid contained in the main vessel or emptied in order to move into the main vessel,
an inner ballast vessel able to be filled or emptied of the liquid contained in the inner ballast vessel of the other module in order to move into the outer ballast vessel,
a ballasted skirt that is suspended on said outer ballast vessel and able to be filled or emptied of the liquid contained in the ballasted vessel of the other module in order to be vertically opened or closed,
first transmission devices connecting the outer ballast vessel with the main vessel and making it possible to multiply and to transmit the movement of the outer ballast vessels to alternators, and
second transmission devices connecting the inner ballast vessel to the outer ballast vessel and making it possible to multiply and to transmit the movement of the inner ballast vessels to alternators.

Said electrical power production system comprises more preferably between the first and second modules:

a lower valve able to put into relation the lower portions of the main vessels,
an upper valve able to put into relation the upper portions of the main vessels,
a first emissary tube arranged between the two lower and upper valves, and able to put into relation under certain conditions the inner ballast vessels,
a second emissary tube arranged under the lower valve, and able to put into relation the lower portions of the ballasted skirts, and
an extendable venting tube connecting the tops of the outer ballast vessels in such a way as to allow for the transfer of the air contained in said outer ballast vessels according to the filling or the emptying of the latter.

Advantageously, the main vessel comprises:
a first valve arranged in the lower portion allowing for the filling of said main vessel by putting it into relation with the first, respectively second, tank,
a second valve arranged on its bottom and allowing for the emptying of the latter by putting it into relation with the first, respectively second, drain.

Advantageously, each one of the first and second transmission devices comprise at least one braking member.

The outer ballast vessel more preferably comprises:
a first valve arranged in the lower portion and allowing for the filling or the emptying of the outer ballast vessel by putting it into relation with the main vessel,
a second lower valve allowing for the emptying of the inner ballast vessel by putting into relation, by the intermediary of the emissary tube under certain conditions, the lower portion of said inner ballast vessel and the upper portion of the inner ballast vessel, and
a third upper valve allowing for the filling of the inner ballast vessel by putting into relation, by the intermediary of the emissary tube under certain conditions, the upper portion of said inner ballast vessel and the lower portion of the inner ballast vessel.

Moreover, the inner ballast vessel advantageously comprises:
a first tube extending in the lower portion and allowing for the emptying of said inner ballast vessel by putting into relation, by the intermediary of the second valve and of the emissary tube under certain conditions, with the upper portion of the inner ballast vessel, and
a second tube extending in the upper portion and allowing for the filling of said inner ballast vessel by putting it into relation, by the intermediary of the second valve and of the emissary tube under certain conditions, with the lower portion of the inner ballast vessel.

Likewise, the ballasted vessel comprises a valve arranged in the lower portion in order to connect it to the second emissary tube and allowing for the filling or the emptying of the ballasted vessel.

According to a preferred embodiment, the ballasted vessel, which comprises in the lower portion a rigid floor and vertically deformable lateral edges, is integral via its upper face with the bottom of the outer ballast vessel and is suspended on the latter by telescopic hangers fastened onto the floor in such a way as to maintain the latter at a fixed and constant distance from the bottom of the main vessel.

Furthermore, the first transmission devices are of the hydraulic type and each comprise at least one first and one second cylinders each able to generate a fluid under pressure in order to actuate a hydraulic motor connected to the alternator, said first cylinder comprising a cylindrical body fastened onto the respective bottom of the main vessel wherein a piston is mobile integral with the associated outer ballast vessel, the second cylinder comprising a cylindrical body fastened onto the respective upper face of said main vessel wherein a piston is mobile integral with the associated outer ballast vessel, with the first and second cylinders of the outer ballast vessel being connected by hydraulic circuits with the first and second cylinders of the outer ballast vessel.

Likewise, the second transmission devices are of the hydraulic type and each comprise at least one first and one second cylinders each able to generate a fluid under pressure in order to actuate a hydraulic motor connected to the alternator, said first cylinder comprising a cylindrical body fastened onto the respective bottom of said outer ballast vessel wherein a piston is mobile integral with the associated inner ballast vessel, said second cylinder comprises a cylindrical body fastened onto the respective upper face of said outer ballast vessel wherein a piston is mobile integral with the associated inner ballast vessel, with the first and second cylinders of the outer ballast vessel being connected together by hydraulic circuits.

According to this latter configuration, the braking member of the first and second transmission devices is advantageously a brake valve provided on their hydraulic circuits.

According to an alternative embodiment, the electrical power production system comprises a plurality of assemblies comprising a first module and a second module and in that the movement of the elements of the first of said assemblies is sequentially offset with respect to the movement of the elements of the second assembly, with the movement of the elements of the latter being sequentially offset with respect to the movement of the elements of the third assembly, and so on.

Advantageously, each one of the first and second valves of the main vessels, of the first and second valves of the outer ballast vessels and of the lower and upper valves is coupled to an alternator.

According to an alternative embodiment, said first and second modules each respectively comprise an upper ballasted skirt arranged on the top of the outer ballast vessel and able to be filled or emptied of the liquid contained in the ballasted vessel, thus called lower ballasted vessel, of the same module in order to be vertically opened or closed.

The upper ballasted vessel, which comprises in the upper portion a rigid ceiling and vertically deformable lateral edges, is more preferably integral via its lower face with the outer ballast vessel and is suspended by telescopic hangers fastened onto said outer ballast vessel.

SUMMARY DESCRIPTION OF THE FIGURES

Other advantages and characteristics shall appear better in the following description of a particular embodiment, provided as a non-limiting example, of an electrical power production system in accordance with the invention, in reference to the annexed drawings wherein.

BEST MANNER FOR TECHNICALLY CARRYING OUT THE INVENTION

Figure 1:
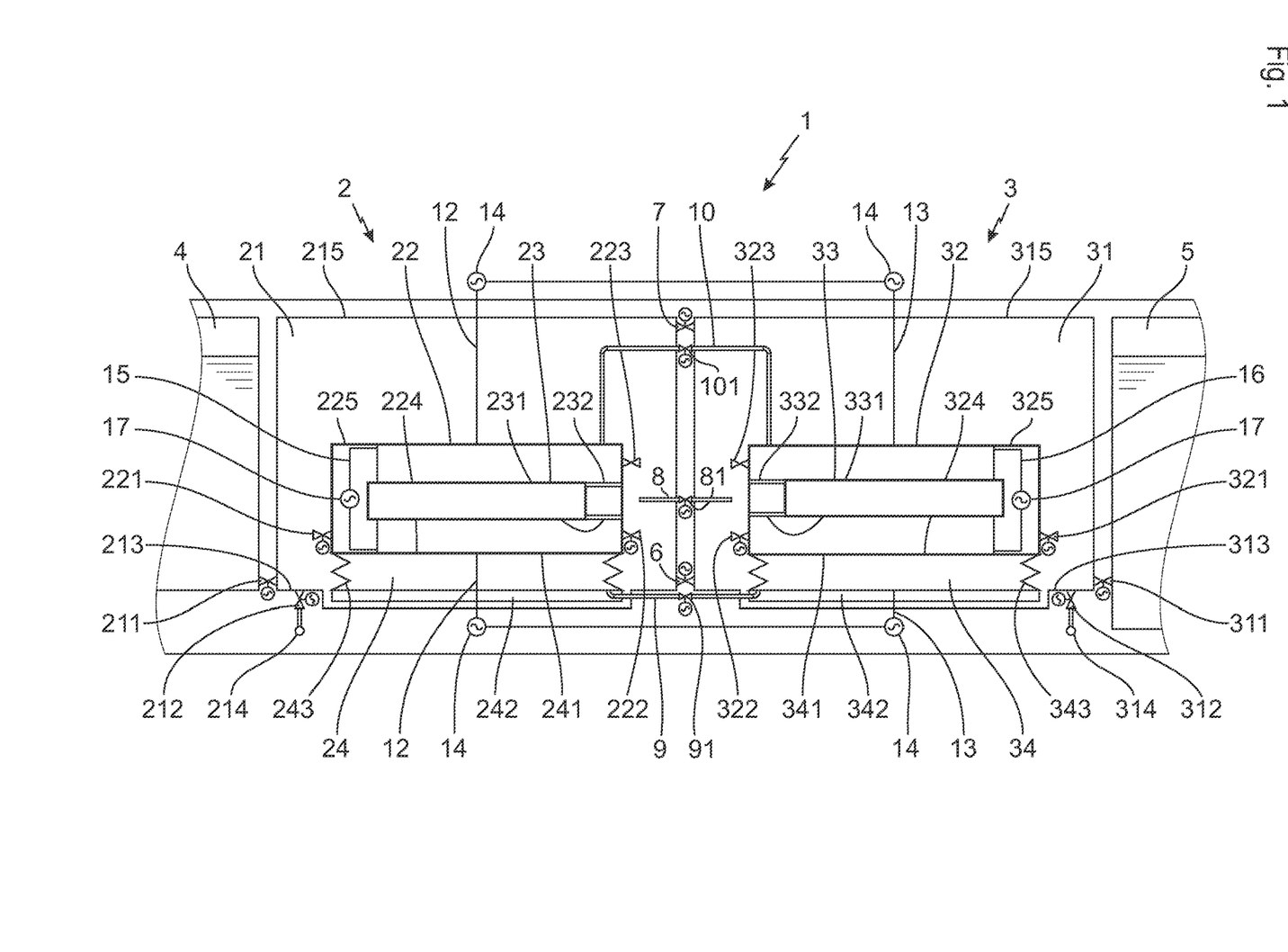
FIG. 1 is a diagrammatical cross-section view of an electrical power production system in accordance with the invention.

In reference to FIG. 1, the electrical power production system 1 in accordance with the invention comprising a first module 2 and a second module 3 arranged adjacently.

Said first module 2 comprises a main vessel 21 able to contain a liquid, more preferably water, an outer ballast vessel 22 arranged inside said main vessel 21, an inner ballast vessel 23 arranged inside said ballast vessel 22 and a ballasted skirt 24 with variable geometry that is suspended on the ballast vessel 22, said main vessel 21, ballast vessel 22, inner ballast vessel 23 and ballasted vessel 24 able to be filled and emptied of said liquid.

By analogy, said second module 2 comprises a main vessel 31, an outer ballast vessel 32, an inner ballast vessel 33 and a ballasted skirt 34 with variable geometry, the main vessel 31, outer ballast 32 and inner ballast 33 vessels and the ballasted vessel 34 being more preferably respectively identical to the main vessels 31, outer ballast 32 and inner ballast 33 and to the ballasted vessel 34 of the first module 2.

Each one of the outer ballast vessels 22, 32 is of a generally parallelepiped shape, made from metal or composite materials, and able to receive a large volume of water in order to obtain a substantial mass.

Each one of the inner ballast vessels 23, 33 is of a constitution and of a geometry similar to the associated outer ballast vessel 22, 32.

The outer ballast vessels 22, 32 and the inner ballast vessels 22, 32 are vertically mobile under the effect of gravity or of Archimedes' buoyancy.

Said first and second modules 2, 3 each comprise liquid inlet and/or outlet valves and are connected together to operate antagonistically, i.e. when the vessel or skirt of the first module 2 is filled, the similar vessel or skirt of the second module 3 is emptied and/or when the vessel or skirt of the first module 2 is in high position the similar vessel or skirt of the second module 3 is in low position.

As such, the main vessel 21 of the first module 2 comprises a first valve 211 arranged in the lower portion of said main vessel 21 on the side opposite the second module 3 and allowing for the filling of said main vessel 21 by putting it into relation with a first liquid tank 4. Said main vessel 21 also comprises a second valve 212 arranged on its bottom 213 on the side opposite the second module 3 and allowing for the emptying of said main vessel 21 by putting it into relation with a first drain 214.

Likewise, the main vessel 31 of the second module 3 comprises a first valve 311 arranged in the lower portion of said main vessel 31 on the side opposite the first module 2 and allowing for the filling of said main vessel 21 by putting it into relation with a second liquid tank 5. Said main vessel 31 also comprises a second valve 312 arranged on its bottom 313 on the side opposite the first module 2 and allowing for the emptying of said main vessel 31 by putting it into relation with a second drain 314.

Said first and second tanks 4, 5 are advantageously continuously or sequentially supplied with a natural source of water making it possible to take advantage of a difference in the high and lower level of water between the first and second tanks 4, 5 and the first and second drains 214, 314 such as, for example, a sea, a lake or a watercourse.

The electrical power production system 1 further comprises between the first and second modules 2, 3:
- a lower valve 6 able to put into relation the respective lower portions of the main vessels 21, 31 of the first and second modules 2, 3,
- an upper valve 7 able to put into relation the respective upper portions of the main vessels 21, 31 of the first and second modules 2, 3,
- a first emissary tube 8 arranged between the two lower 6 and upper 7 valves, and able to put into relation under certain conditions the respective inner ballast vessels 23, 33 of the first and second modules 2, 3,
- a second emissary tube 9 arranged under the lower valve 6, and able to put into relation the respective lower portions of the ballasted skirts 24, 34 of the first and second modules 2, 3, and
- an extendable venting tube 10 connecting the top of the outer ballast vessel 22 of the first module 2 and the top of the outer ballast vessel 32 of the second module 3 in such a way as to allow for the transfer of the air contained in said outer ballast vessels 22, 32 according to the filling or the emptying of the latter.

The outer ballast vessel 22 of the first module 2 comprises a first valve 221 arranged in the lower portion of said outer ballast vessel 22 on the side opposite the second module 3 and allowing for the filling or the emptying of the outer ballast vessel 22 by putting into relation the latter and the main vessel 21 of the first module 2.

Furthermore, the outer ballast vessel 22 of the first module 2 comprises on the side of the second module 3:
- a second lower valve 222 allowing for the emptying of the inner ballast vessel 23 of the first module 2 by putting into relation, by the intermediary of the emissary tube 8 under certain conditions, the lower portion of said inner ballast vessel 23 and the upper portion of the inner ballast vessel 33 of the second module 3, and
- a third upper valve 223 allowing for the filling of the inner ballast vessel 23 of the first module 2 by putting into relation, by the intermediary of the emissary tube 8 under certain conditions, the upper portion of said inner ballast vessel 23 and the lower portion of the inner ballast vessel 33 of the second module 3.

Moreover, the inner ballast vessel 23 of the first module 2 comprises:
- a first tube 231 extending in the lower portion of said inner ballast vessel 23 in the direction of the second module 3 and allowing for the emptying of said inner ballast vessel 22 by being put into relation, by the intermediary of the second valve 222 and of the emissary tube 8 under certain conditions, with the upper portion of the inner ballast vessel 33 of the second module 3, and
- a second tube 232 extending in the upper portion of said inner ballast vessel 23 in the direction of the second module 3 and allowing for the filling of said inner ballast vessel 22 by being put into relation, by the intermediary of the second valve 223 and of the emissary tube 8 under certain conditions, with the lower portion of the inner ballast vessel 33 of the second module 3.

The ballasted vessel 24 of the first module 2 is integral via its upper face 241 with the bottom 224 of the outer ballast vessel 22 and is suspended on the latter by telescopic hangers not shown, with the latter being more preferably of the hydraulic type and comprising cylinders in order to allow for the opening and the closing of said ballasted vessel 24, with the latter being suspended after the outer ballast vessel 22 in order to increase the volume of useful water of it.

Said ballasted vessel 24 is with variable geometry and comprises in the lower portion a rigid and reinforced floor 242, whereon are fastened, in addition to the telescopic hangers, vertically deformed lateral edges 243, advantageously in the form of bellows, in such a way that the upper face 241 and floor 242 can either come together in order to send the liquid that it contains to the ballasted vessel 34 of the second module 3, or move apart in order to receive the liquid contained in said ballasted vessel 34.

Finally, the ballasted vessel 24 of the first module 2 comprises a valve, not shown, arranged in the lower portion of said ballasted vessel 24 in order to connect the latter to the second emissary tube 9 and allowing for the filling or the emptying of the ballasted vessel 24. To do this, the floor 242 of said ballasted vessel 24 is maintained at a fixed and constant distance from the bottom 213 of the main vessel 21.

By analogy with the first module 2, the second module 3 is such that its outer ballast vessel 32 comprises a first valve 321 arranged in the lower portion of said outer ballast vessel 32 on the side opposite the first module 2 and allowing for the filling or the emptying of said outer ballast vessel 32 by putting into relation the latter and the main vessel 31 of the second module 3.

Furthermore, the outer ballast vessel 32 of the second module 3 comprises on the side of the first module 2:
- a second lower valve 322 allowing for the emptying of the inner ballast vessel 33 of the first module 2 by putting into relation, by the intermediary of the emissary tube 8 under certain conditions, the lower portion of said inner ballast vessel 33 and the upper portion of the inner ballast vessel 23 of the first module 2, and
- a third upper valve 323 allowing for the filling of the inner ballast vessel 33 of the second module 3 by putting into relation, by the intermediary of the emissary tube 8 under certain conditions, the upper portion of said inner ballast vessel 33 and the lower portion of the inner ballast vessel 23 of the first module 2.

Moreover, the inner ballast vessel 33 of the second module 3 comprises:
- a first tube 331 extending in the upper portion of said inner ballast vessel 33 in the direction of the first module 2 and allowing for the emptying of said inner ballast vessel 32 by being put into relation, by the intermediary of the second valve 322 and of the emissary tube 8 under certain conditions, with the upper portion of the inner ballast vessel 23 of the first module 2, and
- a second tube 332 extending in upper portion of said inner ballast vessel 33 in the direction of the first module 2 and allowing for the filling of said inner ballast vessel 32 by being put into relation, by the intermediary of the second valve 323 and of the emissary tube 8 under certain conditions, with the lower portion of the inner ballast vessel 23 of the first module 2.

The ballasted vessel 34 of the second module 3 is integral via its upper face 341 with the bottom 324 of the outer ballast vessel 32 and is suspended on the latter by telescopic hangers not shown, with the latter being more preferably of the hydraulic type and comprising cylinders in order to allow for the opening and the closing of said ballasted vessel 34, said telescopic hangers being suspended after the outer ballast vessel 32 in order to increase the volume of useful water of it and therefore the useful mass of water.

The telescopic hangers of the second module 3 are hydraulically connected to the telescopic hangers of the first module 2 operating antagonistically. As such, as the outer ballast vessel 32 descends, the hydraulic hangers, retaining the ballasted vessel 34 of the second module 3, will maintain it at a fixed and constant distance from the bottom 313 of the main vessel 31, and the hydraulic connection will allow for the reverse movements in the telescopic hangers of the ballasted vessel 34 of the first module 2.

Said ballasted vessel 34 is with variable geometry and comprises in the lower portion a rigid and reinforced floor 342, whereon are fastened, in addition to the telescopic hangers, vertically deformable lateral edges 343, advantageously in the form of bellows, in such a way that the upper face 341 and floor 342 can either come together in order to send the liquid that it contains to the ballasted vessel 24 of the first module 2, or move apart in order to receive the liquid contained in said ballasted vessel 24.

Finally, the ballasted vessel 34 of the second module 3 comprises a valve, not shown, arranged in the lower portion of said ballasted vessel 34 in order to connect the latter to the second emissary tube 9 and allowing for the filling or the emptying of the ballasted vessel 34. To do this, as described above, the floor 342 of said ballasted vessel 34 is maintained at a fixed and constant distance from the bottom 313 of the main vessel 31.

The electrical power production system 1 also comprises at least first transmission devices 12, 13 connecting respectively the outer ballast vessel 22, 32 of the first and second modules 2, 3 to the associated main vessel 21, 31, said first transmission devices 12, 13 making it possible to multiply and to transmit the vertical alternative movement of the associated outer ballast vessels 22, 32 to alternators 14 in order to produce electric current.

Furthermore, these first transmission devices 12, 13 each comprise a braking member, not shown, making it possible to block in position each one of the outer ballast vessels 22, 32 and to not allow either the rising of the latter under the effect of Archimedes' buoyancy when the level of water in the associated main vessel 21, 31 has not reached its maximum height, or the descent of the latter under the effect of gravity when the level of water in the associated main vessel 21, 31 has not reached its minimum height. On the contrary, when the level of water in the main vessel 21, 31 is optimal, each braking member allow each one of the outer ballast vessels 22, 32 to descend vertically thanks to the force of gravity, or to rise vertically under the effect of Archimedes' buoyancy.

According to a preferred embodiment not shown, the first transmission devices 12, 13 are of the hydraulic type and each comprise at least one first and one second cylinders each able to generate a fluid, advantageously oil, under pressure in order to actuate a hydraulic motor connected to an alternator 14.

The first cylinder comprises a cylindrical body fastened onto the respective bottom 213, 313 of said main vessel 21, 31 wherein a piston is mobile integral with the associated outer ballast vessel 22, 32 and dependent on its vertical downward and upward movements generated by Archimedes' buoyancy and by the weight.

The second cylinder comprises a cylindrical body fastened onto the respective upper face 215, 315 of said main vessel 21, 31 wherein a piston is mobile integral with the associated outer ballast vessel 22, 32 and dependent on its vertical downward and upward movements generated by Archimedes' buoyancy and by the weight.

Advantageously, the piston of the first cylinder and the piston of the second cylinder are a single and same part passing through the associated outer ballast vessel 22, 32.

The fluid used in the first transmission devices 12, 13 flows in a closed circuit. Indeed, the first transmission devices 12 and 13 are connected together by hydraulic circuits, not shown, which can withstand high pressure and allow for the connection through the oil of the first cylinder of the outer ballast vessel 22 with the first cylinder of the outer ballast vessel 32, in such a way that each length of the circuit is identical and the synchronism of the movements is perfect, when the outer ballast vessel 22 descends, the outer ballast vessel 32 will rise.

In this configuration, the braking members are a brake valve provided on the hydraulic circuits and making it possible to fully open or close the passage of the flow of oil. Each brake valve is a valve, for example of the butterfly type, positioned at the outlet of each first and second cylinder and able to be closed 100% by servo control. This brake valve can be either closed in order to block in position each one of the outer ballast vessels 22, 32, or 100% open in order to allow each one of the outer ballast vessels 22, 32 to vertically move down or up.

Moreover, the electrical power production system 1 also comprises at least two second transmission devices 15, 16 connecting respectively the inner ballast vessel 23, 33 of the first and second modules 2, 3 to the associated outer ballast vessel 22, 32, with said second transmission devices 15, 16 making it possible to multiply and transmit the vertical alternative movement from the associated inner ballast vessels 23, 33 to alternators 17 in order to produce electric current.

Furthermore, these second transmission devices 15, 16 each comprise a braking member, not shown, making it possible to block in position each one of the inner ballast vessels 23, 33 and to not allow either the rising of the latter under the effect of Archimedes' buoyancy when the level of water in the associated outer ballast vessel 22, 32 has not reached its maximum height, or the descent of the latter under the effect of gravity when the level of water in the associated outer ballast vessel 22, 32 has not reached its minimum height. On the contrary, when the level of water in the outer ballast vessel 22, 32 is optimal, each braking member allows each one of the inner ballast vessels 23, 33 to descend vertically thanks to the force of gravity, or to rise vertically under the effect of Archimedes' buoyancy.

According to a preferred embodiment not shown, the second transmission devices 15, 16 are of the hydraulic type and each comprise at least one first and one second cylinders each able to generate a fluid, advantageously oil, under pressure in order to actuate a hydraulic motor connected to an alternator 17.

The first cylinder comprises a cylindrical body fastened onto the respective bottom 224, 324 of said outer ballast vessel 22, 32 wherein a piston is mobile integral with the associated inner ballast vessel 23, 33 and dependent on its vertical upward and downward movements generated by Archimedes' buoyancy and by the weight.

The second cylinder comprises a cylindrical body fastened onto the respective upper face 225, 325 of said outer ballast vessel 22, 32 wherein a piston is mobile integral with the associated inner ballast vessel 23, 33 and dependent on its vertical downward and upward movements generated by Archimedes' buoyancy and by the weight.

Advantageously, the piston of the first cylinder and the piston of the second cylinder are a single and same part passing through the associated outer ballast vessel 22, 32.

The fluid used in the second transmission devices 15, 16 flows in a closed circuit. Indeed, the first and second cylinders of the second transmission devices 15 and 16 are connected together by hydraulic circuits, not shown, which withstand high pressures.

In this configuration, the braking members are a brake valve provided on the hydraulic circuits and making it possible to fully open or close the passage of the flow of oil. Each brake valve is a valve, for example of the butterfly type, positioned at the outlet of each first and second cylinder and able to be closed 100% by servo control. This brake valve can be either closed in order to block in position each one of the inner ballast vessels 23, 33, or 100% open in order to allow each one of the inner ballast vessels 23, 33 to vertically move down or up.

Without leaving the scope of this invention, the respective inner ballast vessels 23, 33 of the first and second modules 2, 3 can comprise a venting tube, not shown in the figures, that puts into relation said inner ballast vessels 23, 33 respectively with the main vessels 21, 31 in order to allow for a transfer of air during the emptying or the filling of said inner ballast vessels 23, 33.

In reference to FIGS. 2A to 2N, the various sequences of a power production cycle implementing the electrical power production system 1 in accordance with the invention comprising an assembly of first and second modules 2, 3 shall now be described.

Figure 2A:
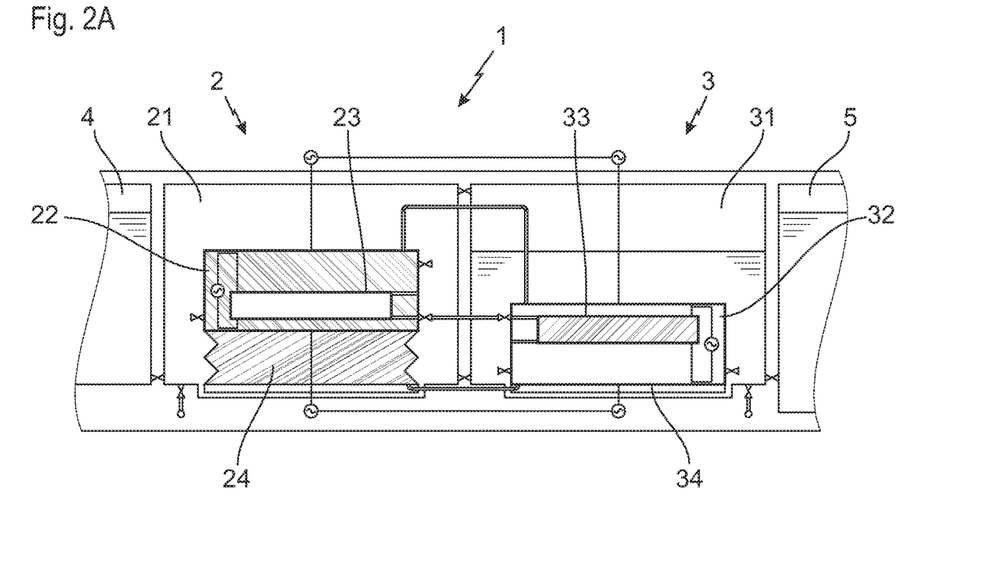
FIGS. 2A to 2N are diagrammatical cross-section views of the system of FIG. 1 at difference sequences of an energy production cycle.

As such, in reference to FIG. 2A, the first step is a situation wherein, on the one hand, the first module 2 is such that its main vessel 21 is empty, its outer ballast vessel 22 is filled and blocked in high position, its inner ballast vessel 23 is empty and blocked in low position and its ballasted skirt 24 is filled and fully opened and, on the other hand, the second module 3 is such that its main vessel 31 is practically full, its outer ballast vessel 32 is empty and blocked in low position, its inner ballast vessel 33 is filled and blocked in high position and its ballasted skirt 24 is empty and entirely closed, with the blocking in position of the various vessels being obtained thanks to the associated brake valves.

The high and low positions of the outer 22, 32 and inner 23, 33 ballast vessels are relative positions in relation to the elements that contain them, namely respectively the main vessels 21, 31 and the outer ballast vessels 22, 32.

Figure 2B:
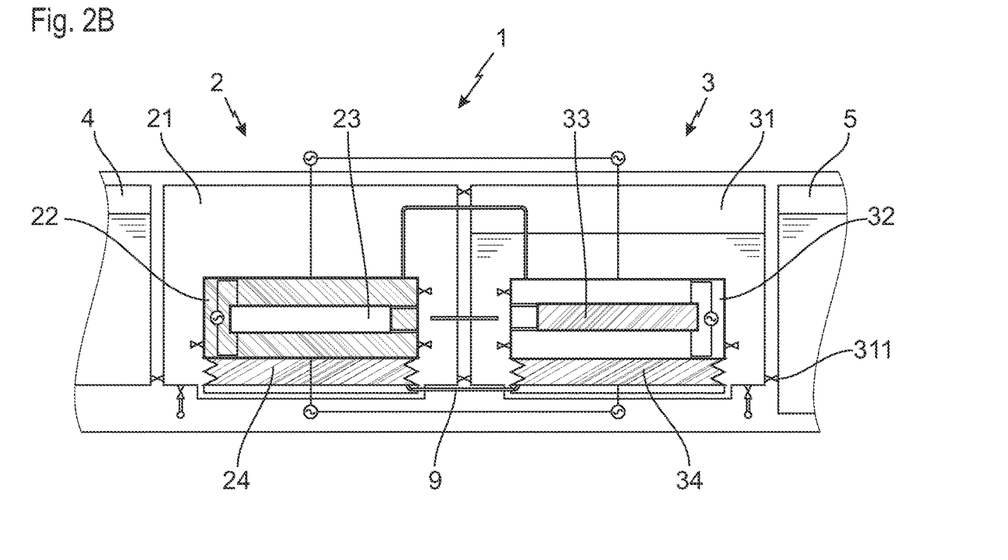

In reference to FIG. 2B, the outer ballast vessel 22 is no longer blocked and descends by gravity by exerting a pressure on the ballasted vessel 24 that tends to send the liquid that it contains to the ballasted vessel 34 thanks to the second emissary tube 9 and associated valves. The inner ballast vessel 23 is no longer blocked and rises under the effect of Archimedes' buoyancy. Moreover, the main vessel 31 continues to be filled thanks to the liquid contained in the second tank 5 and passing through the first valve 311. The outer ballast vessel 32 is no longer blocked and rises under the effect of Archimedes' buoyancy and of the opening of the ballasted vessel 34 which is filled. The inner ballast vessel 33 is no longer blocked and descends by gravity.

Figure 2C:
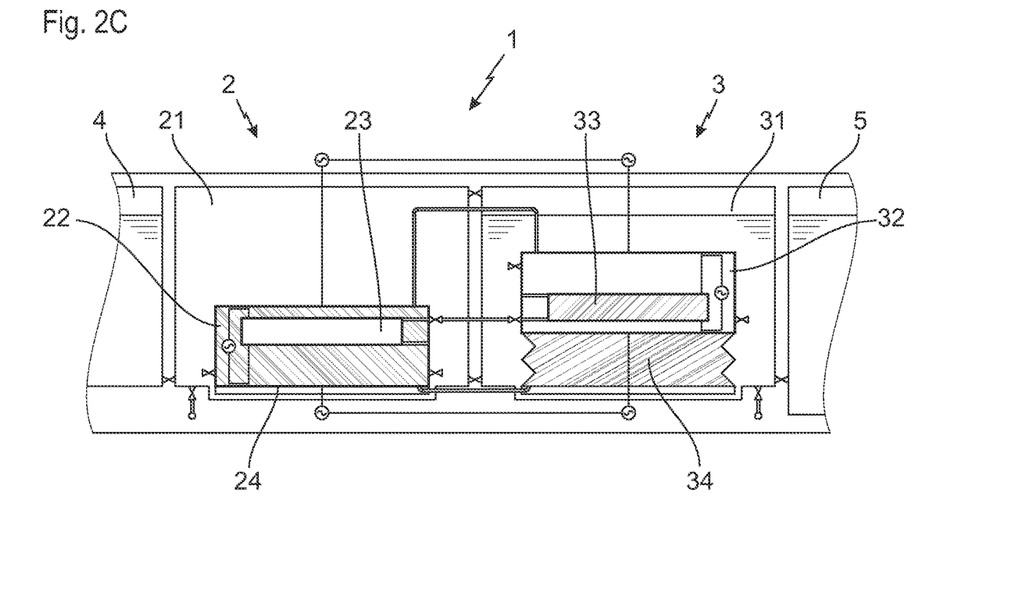

In reference to FIG. 2C, the first module 2 is now such that its outer ballast vessel 22 is filled and in low position, its inner ballast vessel 23 is empty and in high position and its ballasted skirt 24 is empty and entirely closed. The second module 3 is now such that its main vessel 31 is entirely full, its level of liquid is at the same altitude as that of the second tank 5 according to the principle of interconnected vessels, its outer ballast vessel 32 is empty and blocked in high position, its inner ballast vessel 33 is filled and in low position and its ballasted skirt 34 is filled and fully opened.

Figure 2D:
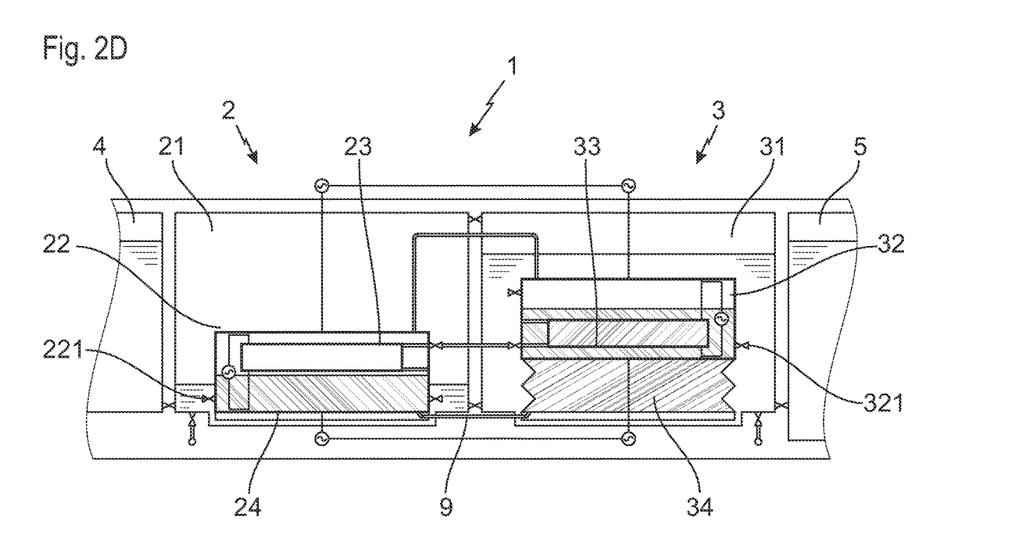

In reference to FIG. 2D, the first valve 221 is open which allows the outer ballast vessel 22 to be emptied into the main vessel 21, with the outer 22 and inner 23 ballast vessels being respectively blocked in low position and in high position. The first valve 321 is open which allows the main vessel 31 to be emptied and to fill the outer ballast vessel 32, with the outer 32 and inner 33 ballast vessels being respectively blocked in high position and in low position. The air contained in the outer ballast vessel 32 is sent, via the venting tube 10, into the outer ballast vessel 22 in order to facilitate the respective filling and emptying of said outer ballast vessels 32, 22.

Figure 2E:
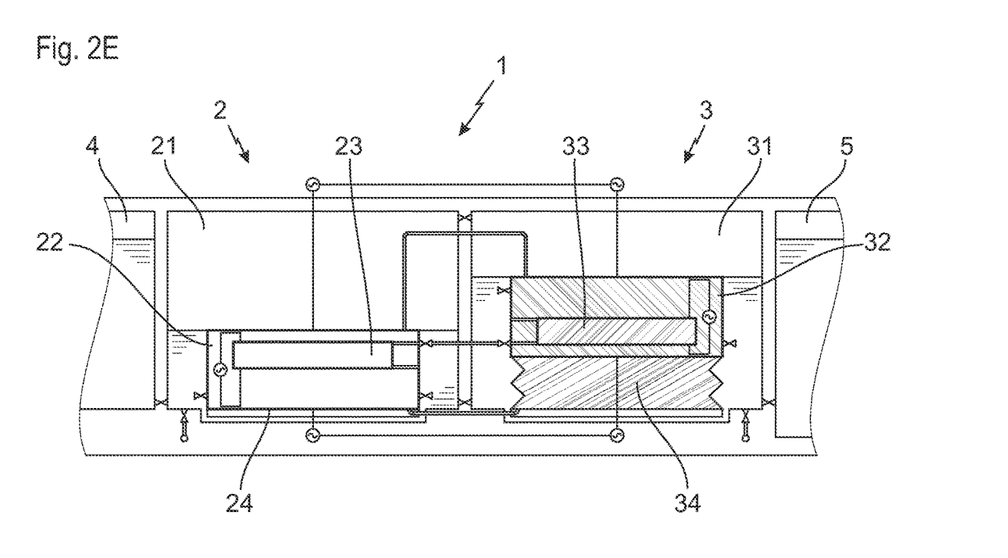

In reference to FIG. 2E, the first module 2 is now such that its main vessel 21 is partially filled, its outer ballast vessel 22 is empty and blocked in low position, its inner ballast vessel 23 is empty and blocked in high position and its ballasted skirt 24 is empty and entirely closed. The second module 3 is now such that its main vessel 31 is partially filled, its outer ballast vessel 32 is full and blocked in high position, its inner ballast vessel 33 is full and blocked in low position and its ballasted skirt 34 is filled and fully opened.

Figure 2F:
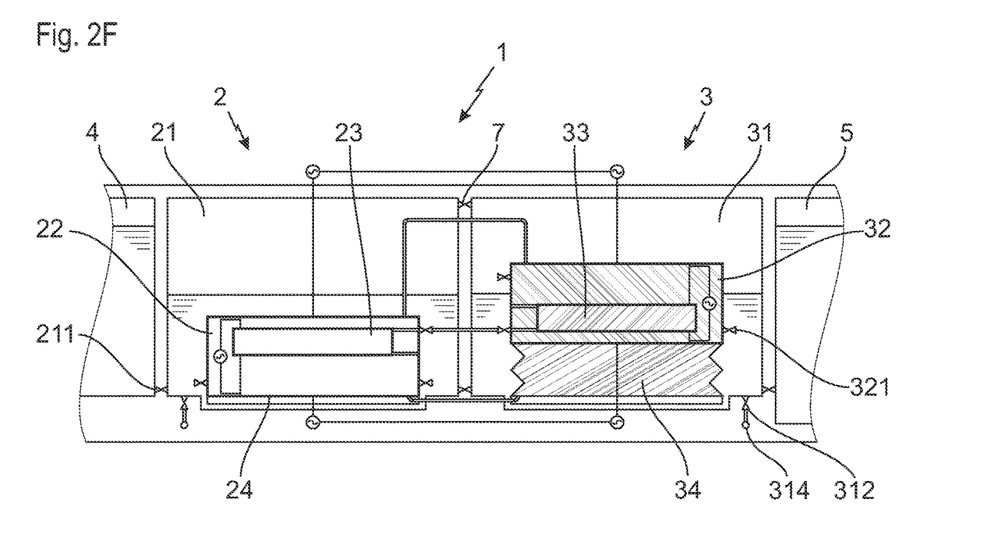

In reference to FIG. 2F, the first valve 211 is open which allows the first tank 4 to continue filling the main vessel 21, with the outer 22 and inner 23 ballast vessels being respectively blocked in low position and in high position. The second valve 312 is open which allows the main vessel 31 to continue being emptied by the second drain 314, with the outer 32 and inner 33 ballast vessels being respectively blocked in high position and in low position. The air contained in the main vessel 21 is sent, via the upper valve 7, into the main vessel 31 in order to facilitate the respective filling and emptying of said main vessels 21, 31.

Figure 2G:
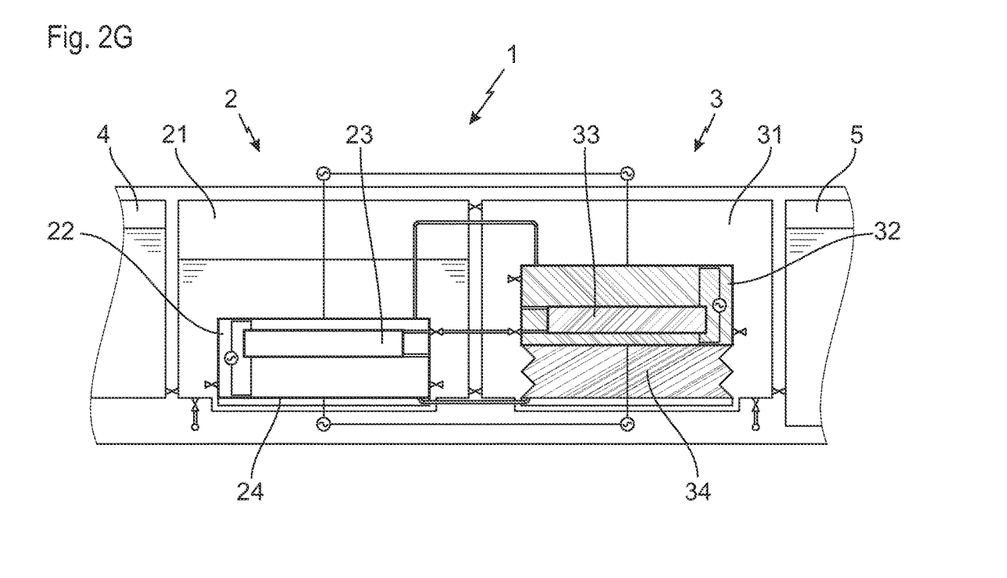

In reference to FIG. 2G, the first module 2 is now such that its main vessel 21 is practically filled, its outer ballast vessel 22 is empty and blocked in low position, its inner ballast vessel 23 is empty and blocked in high position and its ballasted skirt 24 is empty and entirely closed. The second module 3 is now such that its main vessel 31 is entirely empty, its outer ballast vessel 32 is full and blocked in high position, its inner ballast vessel 33 is full and blocked in low position and its ballasted skirt 34 is filled and fully opened.

Figure 2H:
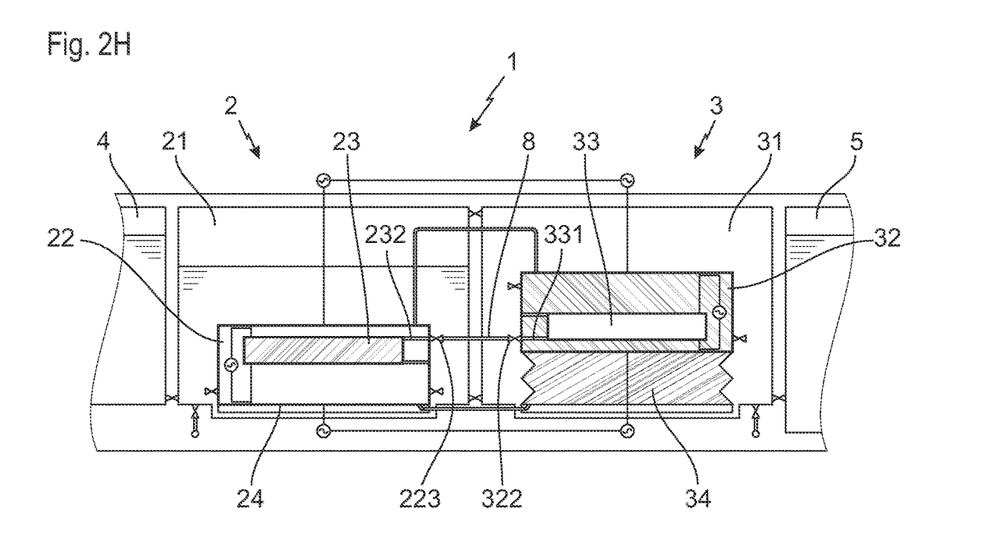

In reference to FIG. 2H, the first and second modules 2, 3 are such that the second tube 232 of the inner ballast vessel 23, the third valve 223 of the outer ballast vessel 22, the first emissary tube 8, the second valve 322 of the outer ballast vessel 32 and the first tube 331 of the inner ballast vessel 33 are configured to put into relation the inner ballast vessels 23 and 33. The third and second valves 223 and 322 are open which allows the inner ballast vessel 33 to be emptied entirely into the inner ballast vessel 23. Once the inner ballast vessel 23 is entirely filled, the third and second valves 223 and 322 are closed.

Figure 2I:
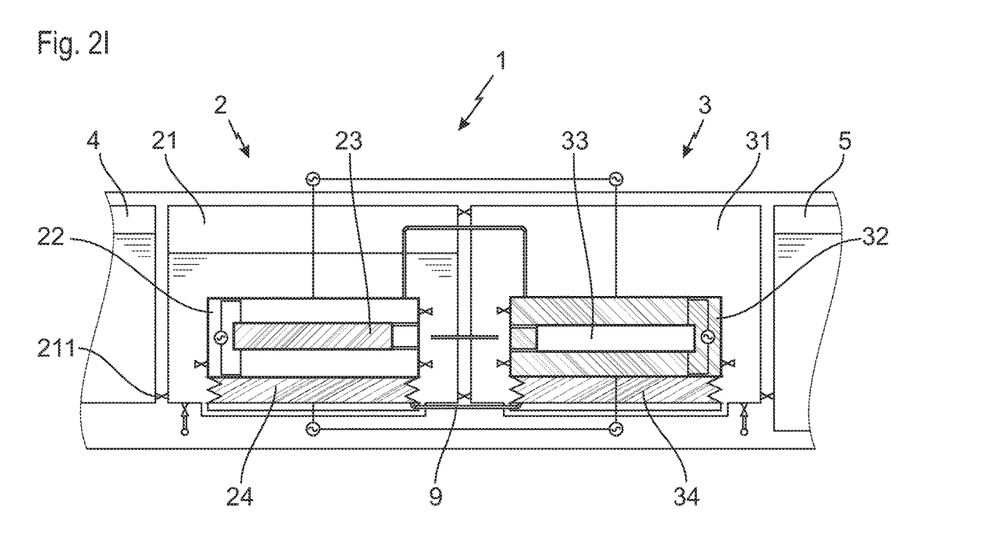

In reference to FIG. 2I, the outer ballast vessel 32 is no longer blocked and descends by gravity by exerting a pressure on the ballasted vessel 34 that tends to send the liquid that it contains to the ballasted vessel 24 thanks to the second emissary tube 9 and associated valves. The inner ballast vessel 33 is no longer blocked and rises under the effect of Archimedes' buoyancy. Moreover, the main vessel 21 continues to be filled thanks to the liquid contained in the first tank 4 and passing through the first valve 211. The outer ballast vessel 22 is no longer blocked and rises under the effect of Archimedes' buoyancy and of the opening of the ballasted vessel 24 which is filled. The inner ballast vessel 23 is no longer blocked and descends by gravity.

Figure 2J:
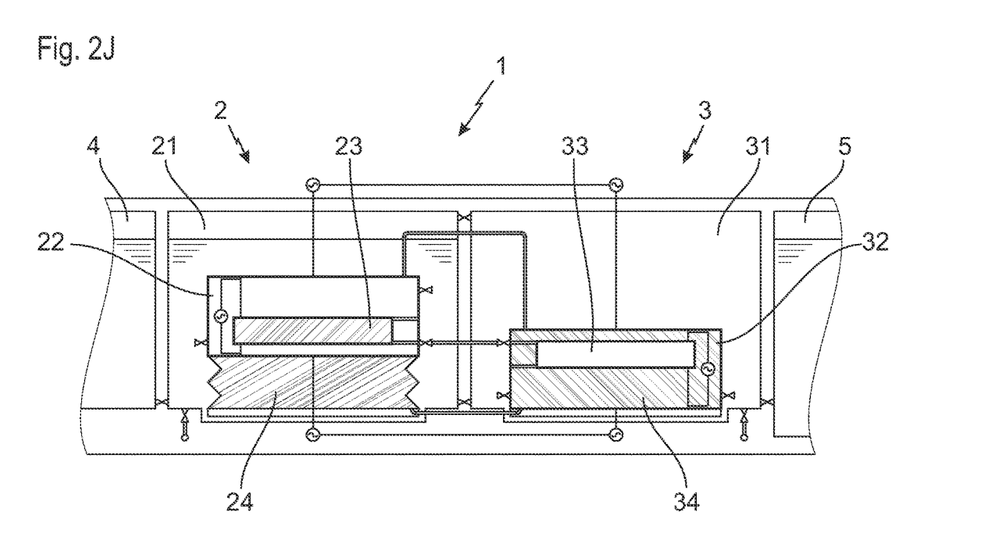

In reference to FIG. 2J, the second module 3 is now such that its outer ballast vessel 32 is filled and in low position, its inner ballast vessel 33 is empty and in high position and its ballasted skirt 34 is empty and entirely closed. The first module 2 is now such that its main vessel 21 is entirely full, its level of liquid is at the same altitude as that of the first tank 4 according to the principle of interconnected vessels, its outer ballast vessel 22 is empty and blocked in high position, its inner ballast vessel 23 is filled and in low position and its ballasted skirt 24 is filled and fully opened.

Figure 2K:
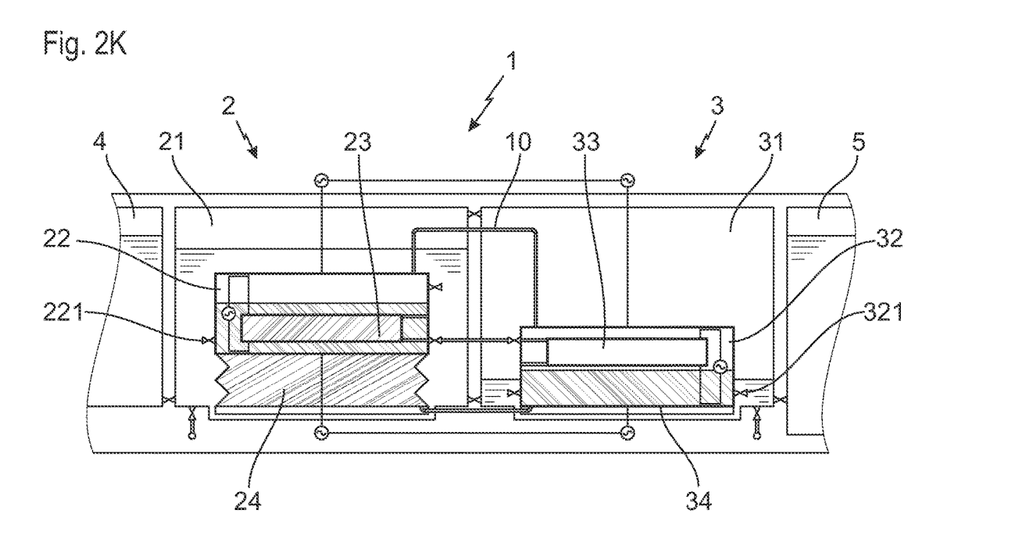

In reference to FIG. 2K, the first valve 321 is open which allows the outer ballast vessel 32 to be emptied into the main vessel 31, with the outer 32 and inner 33 ballast vessels being respectively blocked in low position and in high position. The first valve 221 is open which allows the main vessel 21 to be emptied and to fill the outer ballast vessel 22, with the outer 22 and inner 23 ballast vessels being respectively blocked in high position and in low position. The air contained in the outer ballast vessel 22 is sent, via the venting tube 10, into the outer ballast vessel 32 in order to facilitate the respective filling and emptying of said outer ballast vessels 22, 32.

Figure 2L:
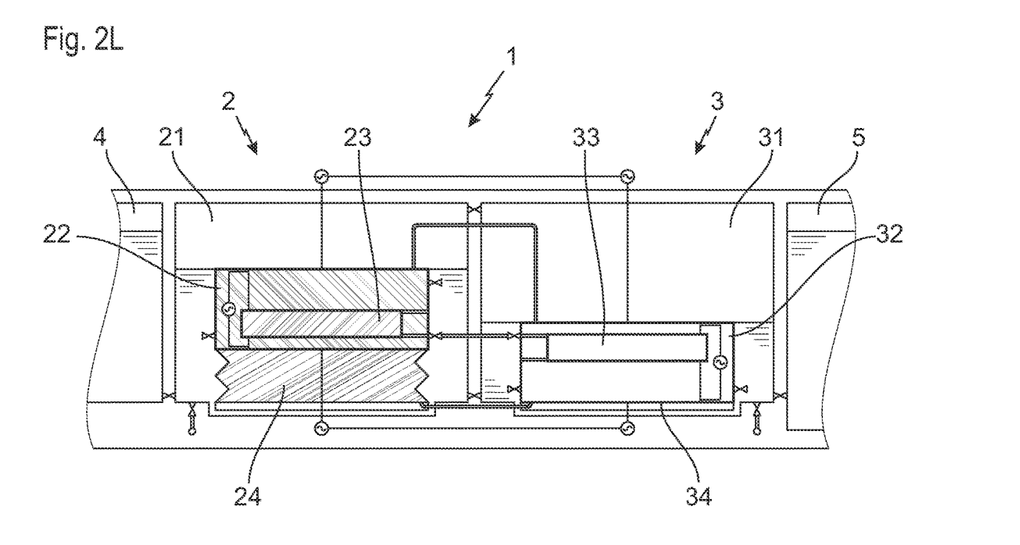

In reference to FIG. 2L, the second module 3 is now such that its main vessel 31 is partially filled, its outer ballast vessel 32 is empty and blocked in low position, its inner ballast vessel 33 is empty and blocked in high position and its ballasted skirt 24 is empty and entirely closed. The first module 2 is now such that its main vessel 21 is partially filled, its outer ballast vessel 22 is full and blocked in high position, its inner ballast vessel 23 is full and blocked in low position and its ballasted skirt 24 is filled and fully opened.

Figure 2M:
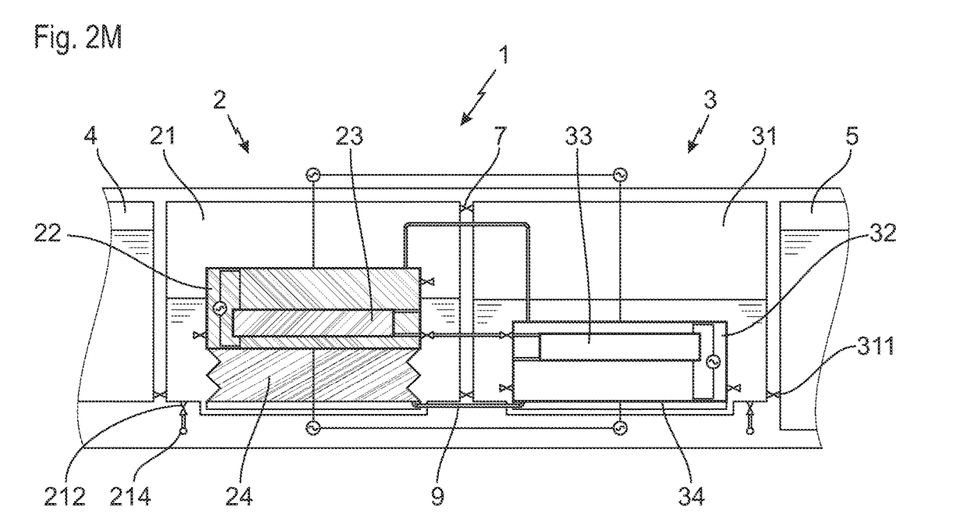

In reference to FIG. 2M, the first valve 311 is open which allows the second tank 5 to continue filling the main vessel 31, with the outer 32 and inner 33 ballast vessels being respectively blocked in low position and in high position. The second valve 212 is open which allows the main vessel 21 to continue being emptied by the first drain 214, with the outer 22 and inner 23 ballast vessels being respectively blocked in high position and in low position. The air contained in the main vessel 31 is sent, via the upper valve 7, into the main vessel 21 in order to facilitate the respective filling and emptying of said main vessels 31, 21.

Figure 2N:
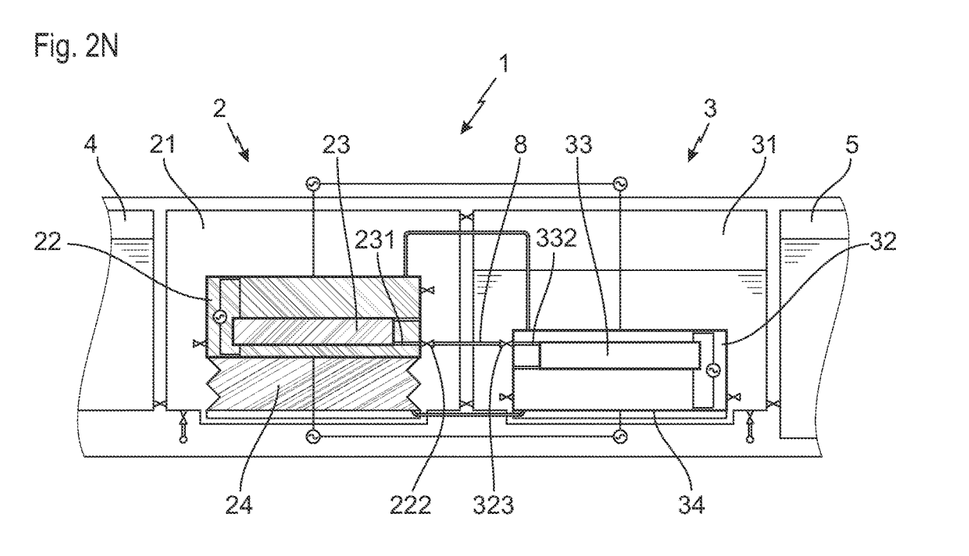

In reference to FIG. 2N, the first module 2 is now such that its main vessel 21 is practically filled, its outer ballast vessel 22 is empty and blocked in low position, its inner ballast vessel 23 is empty and blocked in high position and its ballasted skirt 24 is empty and entirely closed. The second module 3 is now such that its main vessel 31 is entirely empty, its outer ballast vessel 32 is full and blocked in high position, its inner ballast vessel 33 is full and blocked in low position and its ballasted skirt 24 is filled and fully opened. In this situation, the first and second modules 2, 3 are such that the first tube 231 of the inner ballast vessel 23, the second valve 222 of the outer ballast vessel 22, the first emissary tube 8, the third valve 323 of the outer ballast vessel 32 and the second tube 332 of the inner ballast vessel 33 are configured to put into relation the inner ballast vessels 23 and 33.

Finally, to return to the situation of FIG. 2A, it is sufficient to open the second and third valves 222 and 323 in order to allow the inner ballast vessel 23 to be emptied entirely into the inner ballast vessel 33. Once the inner ballast vessel 33 is entirely filled, the third and second valves 223 and 322 are closed.

In reference to FIG. 1, it is well understood that the relative back-and-forth movements between their high and low position, of the outer 22, 32 and inner 23, 33 ballast vessels inside respectively the main vessels 21, 31 and the outer ballast vessels 22, 32 generate electrical current thanks to the first 12, 13 and second transmission devices 15, 16 and their associated alternators 14, 17.

According to an advantageous embodiment, the electrical power production system 1 in accordance with the invention comprises a plurality of assemblies of first and second modules 2, 3. In this configuration, it is interesting to implement a sequential shift between each one of said assemblies. Said sequential shifting consists in shifting, by at least one sequence, the movement of the elements of a first assembly with respect to the movement of the elements of a second assembly, the movement of the elements of the latter also being shifted with respect to the movement of the elements of a third assembly, and so on, so as to render more constant the production of power, and to suppress the peaks and low period of production.

In addition, according to an alternative embodiment not shown, the electrical power production system 1 in accordance with the invention can include, in order to further increase the production of power, additional devices for the production of power.

As such, the thermal energy obtained thanks to the heating of the hydraulic fluid associated with the first and second cylinders of the first 12, 13 and second transmission devices 15, 16 can be used to produce hot water which can:
- in cold periods, supply collective heating, greenhouses or dedicated industries, and
- in hot periods where the collective heating is no longer necessary, supply the external power motors, of the Stirling type for example, coupled to alternators for the purposes of electrical production.

Indeed, it is known that the purpose of an external power motor is to produce using thermal energy, that of the hot water of said first and second cylinders of the first 12, 13 and second transmission devices 15, 16, mechanical energy used to advantageously drive an alternator.

Likewise, each one of the valves of the electrical power production system 1, in particular each one of the first 211, 311 and second valves 212, 312 of the main vessels 21, 31, of the first 221, 321 and second valves 222, 322 of the outer ballast vessels 22, 32, and of the lower 6 and upper 7 valves, whether it is hydraulic or aeraulic, is coupled to an alternator, shown solely in FIG. 1 in order to avoid overloading the other figures.

Likewise, advantageously, the first emissary tube 8, the second emissary tube 9 and the venting tube 10 also comprise and respectively a turbine 81, 91, 101 coupled to an alternator, shown solely in FIG. 1 in order to avoid overloading the other figures.

Finally, it is well understood that the electrical power production system 1 according to the invention is particularly interesting, easy to implement and is non-polluting. Indeed, it is necessary that a source of water for continuously supplying the first and second tanks 4, 5 so that the latter have a substantially constant level. Furthermore, said system 1 does not produce any pollution since its hydraulic circuits are closed and the water used to move the various elements of the first and second modules 2, 3 does not undergo any particular treatment or any increase in temperature. Finally, the system 1 can also produce hot water in order to supply an industrial or residential building.

DESCRIPTION OF OTHER EMBODIMENTS

According to an alternative embodiment, not shown, the electrical power production system 1, according to the invention, further comprises, on the respective outer ballast vessel 22, 32 of each one of the first and second modules 2, 3, an upper ballasted skirt with variable geometry arranged above said outer ballast vessel 22, 32 and able to be filled or emptied of liquid in order to be vertically opened or closed. Each upper ballasted vessel is integral via its lower face with the respective upper face 225, 325 of said associated outer ballast vessel 22, 32 and is suspended by telescopic hangers not shown, with the latter being more preferably of the hydraulic type and comprising cylinders in order to allow for the opening and the closing of said upper ballasted vessel, with the latter being integral with the outer ballast vessel 22 in order to increase the volume of useful water of it.

Said upper ballasted vessel with variable geometry is similar to the ballasted vessel 24, 34 described hereinabove, thus called lower ballasted vessel, and comprises in the upper portion a rigid and reinforced ceiling, whereon are fastened, in addition to the telescopic hangers, vertically deformable lateral edges, advantageously in the form of bellows, in such a way that its lower face and ceiling can either come together in order to expulse the liquid that it contains, or be moved apart in order to receive liquid.

The lower 24, 34 and upper ballasted skirts of an outer ballast vessel 22, 32 communicate with each other via columns that allow the water and air to pass from the lower skirt 24, 34 to the upper skirt and inversely. The exchanges of water and air also operate between the variable skirts via antagonism, which means that, when the lower 24, 34 and upper ballasted skirts of a first module 2 are filled with water, the lower 24, 34 and upper ballasted skirts of the second module 3 will be filled with air.

Consequently, in this case of use, via the first 2 or second module 3, of the force generated by gravity, the outer ballast vessel 22 respectively 32 will descend vertically thanks to the lower ballasted vessel 24 respectively 34, which will retract as the vertical descent takes place, therefore losing mass, but which will be entirely offset by the vertical opening upwards of the upper ballasted vessel, which will receive the water from the lower ballasted vessel 24 respectively 34 via the communication columns, said upper ballasted vessel will as such contain a mass that is identical to that lost by the lower ballasted vessel 24 respectively 34.

Consequently, the total of the masses of water and volumes of air contained in the lower 24, 34 and upper ballasted skirts of a module 2, 3 are always the same, with one of the skirts always being the complement of the other.

The variable skirts can communicate with each other with a view of saving water, i.e. once the main vessel and its lower skirt are filled with water will have reached bottom dead centre, the assembly can be emptied (to 50%) in the assembly of the main skirt and variable skirt emptied of water, reaching top dead centre, then the excess water will be removed.

This alternative embodiment is particularly advantageous as it makes it possible to add, on the one hand, substantial masses of water to each outer ballast vessel 22, 32 in order to increase the power obtained thanks to gravity and, on the other hand, substantial volumes of air at the outer ballast vessel 32, 22 in order to increase the power obtained by Archimedes' buoyancy.

POSSIBILITY FOR INDUSTRIAL APPLICATION

It is well understood that the electrical power production system 1 according to the invention is more preferably installed in the immediate vicinity of a river wherein water is taken upstream in order to supply the first and second tanks 4, 5 and the water drained from the first and second modules 2, 3 is discharged downstream by the first and second drains 214, 314. However, it is well understood that said electrical power production system 1 can also be installed in the vicinity of any other source of water such as, for example, a lake or a sea.

Finally, it goes without saying that the examples of the electrical power production system 1 in accordance with the invention which have just been described are only particular illustrations, and do not in any way limit the invention.

The invention claimed is:

1. An electrical power production system comprising:
   at least one assembly including a first module and a second module, which operate antagonistically, said first and second modules being identical, symmetrical, and each include, respectively a main vessel connected respectively, on the one hand, to a first or second liquid tank and, on the other hand, to a first or second drain, and able to be filled with said liquid or emptied, wherein said first and second modules each respectively comprise:
   an outer ballast vessel able to be filled with the liquid contained in the main vessel or emptied in order to move into the main vessel;
   an inner ballast vessel able to be filled or emptied of the liquid contained in the inner ballast vessel of the other module in order to move into the outer ballast vessel;
   a ballasted skirt that is suspended on said outer ballast vessel and able to be filled or emptied of the liquid contained in the ballasted vessel of the other module in order to be vertically opened or closed; first transmission devices connecting the outer ballast vessel to the main vessel and making it possible to transmit the movement of the outer ballast vessels to alternators; and
   second transmission devices connecting the inner ballast vessel to the outer ballast vessel and making it possible to transmit the movement of the inner ballast vessels to alternators.

2. The system according to claim 1, wherein each one of the first and second transmission devices have at least one braking member.

3. The system according to claim 1, wherein between the first and second modules:
   a lower valve able to put into relation the lower portions of the main vessels;
   an upper valve able to put into relation the upper portions of the main vessels;
   a first emissary tube arranged between the two lower and upper valves, and able to put into relation under certain conditions the inner ballast vessels;
   a second emissary tube arranged under the lower valve, and able to put into relation the lower portions of the ballasted skirts and; and
   an extendable venting tube connecting the tops of the outer ballast vessels and in such a way as to allow for the transfer of the air contained in said outer ballast vessels according to the filling or the emptying of the latter.

4. The system according to claim 1, wherein the main vessel further comprises:
   a first valve arranged in the lower portion allowing for the filling of said main vessel by putting it into relation with a first, respectively second, tank; and a second valve arranged on its bottom and allowing for the emptying of the latter by putting it into relation with the first, respectively second, drain.

5. The system according to claim 3, wherein the outer ballast vessel further comprises:
a first valve arranged in the lower portion and allowing for the filling or the emptying of the outer ballast vessel by putting it into relation with the main vessel;
a second lower valve allowing for the emptying of the inner ballast vessel by putting into relation, by the intermediary of the emissary tube under certain conditions, the lower portion of said inner ballast vessel and the upper portion of the inner ballast vessel; and
a third upper valve allowing for the filling of the inner ballast vessel by putting into relation, by the intermediary of the emissary tube under certain conditions, the upper portion of said inner ballast vessel and the lower portion of the inner ballast vessel.

6. The system according to claim 5, wherein the inner ballast vessel further comprises:
a first tube extending in the lower portion and allowing for the emptying of said inner ballast vessel by putting into relation, by the intermediary of the second valve and of the emissary tube under certain conditions, with the upper portion of the inner ballast vessel;
a second tube extending in the upper portion and allowing for the filling of said inner ballast vessel by putting it into relation, by the intermediary of the second valve and of the emissary tube under certain conditions, with the lower portion of the inner ballast vessel; and
a vent putting into relation said inner ballast vessel respectively with the main vessels.

7. The system according to claim 3, wherein the ballasted vessel further comprises a valve arranged in the lower portion in order to connect it to the second emissary tube and allowing for the filling or the emptying of the ballasted vessel.

8. The system according to claim 4, wherein the ballasted vessel, which includes in the lower portion a rigid floor and vertically deformable lateral edges, is integral via its upper face with the bottom of the outer ballast vessel and is suspended on the latter by telescopic hangers fastened onto the floor in such a way as to maintain the latter at a fixed and constant distance from the bottom of the main vessel.

9. The system according to claim 1, wherein the first transmission devices are of the hydraulic type and each include at least one first and one second cylinders each able to generate a fluid under pressure in order to actuate a hydraulic motor connected to the alternator, said first cylinder including a cylindrical body fastened onto the respective bottom of the main vessel wherein a piston is mobile integral with the associated outer ballast vessel, with the second cylinder including a cylindrical body fastened onto the respective upper face of said main vessel wherein a piston is mobile integral with the associated outer ballast vessel, with the first and second cylinders of the outer ballast vessel being connected by hydraulic circuits with the first and second cylinders of the outer ballast vessel.

10. The system according to claim 1, wherein the second transmission devices are of the hydraulic type and each include at least one first and one second cylinder each able to generate a fluid under pressure in order to actuate a hydraulic motor connected to the alternator, said first cylinder including a cylindrical body fastened onto the respective bottom of said outer ballast vessel wherein a piston is mobile integral with the associated inner ballast vessel, said second cylinder includes a cylindrical body fastened onto the upper face respective of said outer ballast vessel wherein a piston is mobile integral with the associated inner ballast vessel, with the first and second cylinders of the outer ballast vessel being connected together by hydraulic circuits.

11. The system according to claim 9, wherein the braking member of the first and second transmission devices is a brake valve provided on their hydraulic circuits.

12. The system according to claim 1, further comprising: a plurality of assemblies including a first module and a second module and the movement of the elements of the first of said assemblies is sequentially offset with respect to the movement of the elements of the second assembly, with the movement of the elements of the latter being sequentially offset with respect to the movement of the elements of the third assembly.

13. The system according to claim 1, wherein each one of the first and second valves of the main vessels, the first and second valves of the outer ballast vessels, and the lower and upper valves is coupled to an alternator.

14. The system according to claim 1, wherein said first and second modules each respectively include an upper ballasted skirt arranged on the top of the outer ballast vessel and able to be filled or emptied of the liquid contained in the ballasted vessel in order to be vertically opened or closed.

15. The system according to claim 14, wherein the upper ballasted vessel, which includes in the upper portion a rigid ceiling and vertically deformable lateral edges, is integral via its lower face with the outer ballast vessel and is suspended by telescopic hangers fastened onto said outer ballast vessel.

* * * * *